Nov. 4, 1924.
R. P. BROWN
1,513,889
FOUNTAIN PEN FOR RECORDING INSTRUMENTS
Filed July 13, 1921
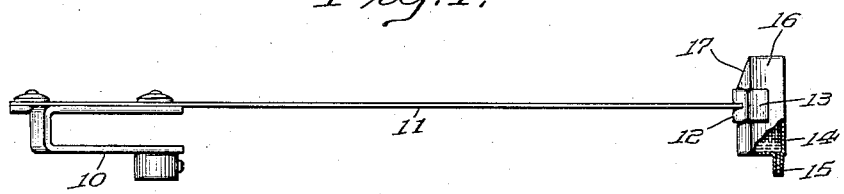
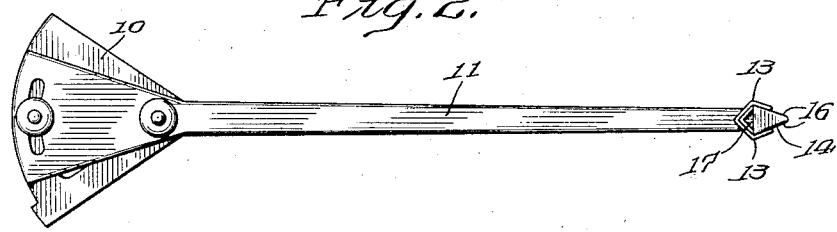
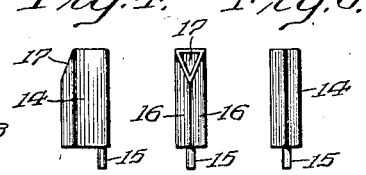
INVENTOR
Richard P. Brown.
WITNESS
F. J. Hartman.
BY
Robert M. Barr
ATTORNEY Patented Nov. 4, 1924.

1,513,889

UNITED STATES PATENT OFFICE.

RICHARD P. BROWN, OF PHILADELPHIA, PENNSYLVANIA, ASSIGNOR TO THE BROWN INSTRUMENT COMPANY, OF PHILADELPHIA, PENNSYLVANIA, A CORPORATION OF PENNSYLVANIA.

FOUNTAIN PEN FOR RECORDING INSTRUMENTS.

Application filed July 13, 1921. Serial No. 484,519.

*To all whom it may concern:*

Be it known that I, RICHARD P. BROWN, a citizen of the United States, and a resident of the city of Philadelphia, county of Philadelphia, State of Pennsylvania, have invented certain new and useful Improvements in Fountain Pens for Recording Instruments, of which the following is a specification.

Some of the objects of the present invention are to provide an improved fountain pen for recording instruments; to provide means for making a record upon a chart or other recording surface, such means including a device for supplying a marking liquid and being arranged to be supported upon a pen arm; to provide a pen of the fountain type for use with recording instruments, which is arranged to cooperate with the usual standard pen arm without changing such arm in any particular or requiring special attachments for holding the pen in operative position; and to provide other improvements as will hereinafter appear.

In the accompanying drawings, Fig. 1 represents a side elevation of a recording pen arm equipped with a pen or stylus embodying the present invention; Fig. 2 represents a plan of the same; Fig. 3 represents a plan of the pen holding portion of the arm with the pen removed; Fig. 4 represents a side elevation of a pen embodying one form of the present invention; Figs. 5 and 6 represent respectively front and rear elevations of the pen shown in Fig. 4.

Referring to the drawings, one form of the present invention is shown in conjunction with a pen arm, of the usual standard type employed with recording instruments, comprising a suitable support 10 carrying a flexible pen arm 11 which has its free end rigidly secured to a pen holder 12. In the usual construction this holder 12 is formed of spring material comprising two clip fingers 13 diverging from a common point at the base for a portion of the length of each, and then both converging for a suitable distance to permit the required spring gripping action when the pen is inserted between the spaced fingers 13.

In order to provide means arranged to cooperate with the pen arm fingers 13 and functioning as a marking device for making the usual chart records, one form of the present invention comprises a thin-walled receptacle or reservoir 14 having a pen or stylus 15, preferably of capillary form, at one end in position to make contact, as required, with the chart, paper or any other means upon which the record is to be made. As shown, the stylus 15 is a tubular hollow part, communicating with the reservoir through the bottom of the latter, and passing its supply of fluid substantially to its point internally. The receptacle 14 is arranged to interfit with the fingers 13 and to that end is shaped to conform to the configuration of the opening formed between the fingers 13. Thus in the present construction the sides 16 of the receptacle 14 form substantially a diamond shape and are arranged substantially parallel to the respective portions of the fingers 13. The upper end portion of the receptacle 14 is provided with an opening 17 at its rear by means of which the receptacle 14 is filled or replenished with ink or other marking fluid from time to time, without necessity for removal from the clip 12 or disturbance of the stylus 15. Also the sides 16 taper outwardly, wedgewise from the rear of the receptacle 14 towards the outer or front edge, thereby providing a small upper end or corner at the front which may be freely inserted between the fingers 13 from below while the lower end is enough larger to place the fingers 13 under tension so that the receptacle 14 is held rigidly and securely in place at the end of the pen arm 11 for marking purposes. As shown, also, the rear upper corner of the reservoir 14 (where the opening 17 is located) is reduced or cut away on a taper, so as to facilitate insertion in the clip 12.

In assembled condition the parts are positioned as shown in Figs. 1 and 2, the pen receptacle or reservoir 14 being firmly held by the fingers 13 in a vertical position, while the pen 15 is properly located for marking purposes. The capillary action of the pen 15 insures a constant supply of marking fluid, for the purpose intended, and the dimensions of the feeding receptacle or reservoir 14 are such as to maintain an available quantity of the fluid for a considerable period of time.

From the foregoing it will be evident that a complete unitary pen of the fountain type has been devised which can be readily attached to or removed from a pen arm, and particularly a pen arm of the standard type, whereby the pen of the present invention can be placed in operative position upon any standard pen arm without employing extra parts or special attachments. Thus the present fountain structure forms a simple, inexpensive attachment for any recording instrument employing a pen and pen arm whereby the ordinary record marking means can be quickly converted to a continuously operative pen functioning in connection with a reserve marking fluid supply.

Although only a single form is shown in which this invention may be embodied, it is to be understood that the invention is not limited to any specific construction, but might be applied in various forms without departing from the spirit of the invention or the scope of the appended claim.

Having thus described my invention, I claim:

A fountain pen for a recording instrument adapted to replace an ordinary recording pen in the spring clip pen holder of such instrument, and comprising a reservoir of flattened, wedge-like cross section adapted to be held securely in the clip; said reservoir being closed at its bottom and provided with a hollow stylus receiving its supply from the reservoir, and at its top reduced rearwardly to facilitate insertion in the clip, and to provide an opening for its replenishment without removal from the clip.

Signed at Philadelphia, in the county of Philadelphia, State of Pennsylvania, this 8 day of July, 1921.

RICHARD P. BROWN.